(12) United States Patent
Buck et al.

(10) Patent No.: US 8,238,574 B2
(45) Date of Patent: Aug. 7, 2012

(54) METHOD FOR DETERMINING A TIME DELAY FOR TIME DELAY COMPENSATION

(75) Inventors: Markus Buck, Biberach (DE); Tobias Wolff, Neu-Ulm (DE); Gerhard Schmidt, Ulm (DE); Tim Haulick, Blaubeuren (DE)

(73) Assignee: Nuance Communications, Inc., Burlington, MA (US)

( * ) Notice: Subject to any disclaimer, the term of this patent is extended or adjusted under 35 U.S.C. 154(b) by 262 days.

(21) Appl. No.: 12/636,160

(22) Filed: Dec. 11, 2009

(65) Prior Publication Data

US 2010/0150364 A1    Jun. 17, 2010

(30) Foreign Application Priority Data

Dec. 12, 2008    (EP) .................................... 08021682

(51) Int. Cl.
    *H04R 3/00*    (2006.01)
(52) U.S. Cl. .............................. 381/92; 381/91; 381/122
(58) Field of Classification Search .................... 381/66, 381/122, 92, 91, 94.1, 71.1
    See application file for complete search history.

(56) References Cited

U.S. PATENT DOCUMENTS

2006/0153360 A1* 7/2006 Kellermann et al. .... 379/406.08
2006/0222184 A1* 10/2006 Buck et al. ................. 381/71.1

FOREIGN PATENT DOCUMENTS

EP     1 633 121 A1    3/2006
WO    WO 2005/050618 A2   6/2005

OTHER PUBLICATIONS

Zohra, Y., et al. "Moving Source Speech Enhancement Using Time-Delay Estimation," 9th Int'l Workshop IWAENC Conference on Acoustic Echo and Noise Control, Sep. 12, 2005, pp. 69-72.
C.C. Ko, et al. "An Adaptive Algorithm for Separating and Tracking Multiple Directional Sources in Linear Arrays," IEEE, vol. 40, No. 3, Mar. 1992, pp. 261-267.
European Patent Office—Extended European Search Report; Application No. 08021682.3-224, Jun. 24, 2009.

* cited by examiner

*Primary Examiner* — Vivian Chin
*Assistant Examiner* — Con P Tran
(74) *Attorney, Agent, or Firm* — Sunstein Kann Murphy & Timbers LLP (57) ABSTRACT

The invention provides a computer-implemented method for determining a time delay for time delay compensation of a microphone signal from a microphone array in a beamformer arrangement. For a given time, an instantaneous estimate of a position of a wanted sound source and/or of a direction of arrival of a signal originating from the wanted sound source is determined. The computer system then determines whether the instantaneous estimate deviates from a preset estimate of a position of the wanted sound source and/or of a direction of arrival of a signal originating from the wanted sound source according to a predetermined criterion. The predetermined criterion comprises a check whether the instantaneous estimate deviates from the preset estimate by at least a predetermined deviation threshold. If the predetermined criterion is fulfilled, the instantaneous estimate for the given time is set by the computer system as the preset estimate, and the computer system determines the time delay for time delay compensation of the microphone signal based on the instantaneous estimate.

39 Claims, 4 Drawing Sheets

METHOD FOR DETERMINING A TIME DELAY FOR TIME DELAY COMPENSATION

PRIORITY

The present U.S. patent application claims priority from European Patent Application No. 08 021 682.3 entitled Method for Determining a Time Delay for Time Delay Compensation filed on Dec. 12, 2008, which is incorporated herein by reference in its entirety.

TECHNICAL FIELD

The present invention relates to a method for determining a time delay for time delay compensation of a microphone signal from a microphone array in a beamformer arrangement.

BACKGROUND ART

The main purpose of a beamformer arrangement is to process acoustic signals in such a way, that signals from a preferred direction are enhanced with respect to signals from other directions. In this way, the signal quality of signals originating from a wanted sound source can be enhanced while noise, originating from different positions or directions of arrival, is reduced or even completely cancelled.

Such systems, an example is known from EP 1 640 971, are used, for instance, for hands-free communication in vehicles, such as voice control or hands-free telephony.

In order to align a beamformer arrangement with a certain preferred direction, the beamformer arrangement usually comprises a microphone array. For each microphone in the microphone array a time delay has to be determined. This time delay originates from a signal propagation delay due to the relative positioning of a wanted sound source with respect to the microphones in the microphone array. By compensating for this time delay and subsequently beamforming the time delay compensated signals, e.g. by weighting and summing of the signals, the beamformer arrangement is aligned with a certain preferred direction.

In general, the position of a wanted sound source and hence the direction of arrival of the acoustic signal, are a function of time. Hence, a re-calculation of time delays is necessary, as an estimate for the position of the wanted sound source varies, e.g. as a speaker moves. Already small variations in the direction of arrival of the acoustic signal will lead to a re-determination of the time delay. This frequent re-calculation is computationally inefficient.

SUMMARY OF THE INVENTION

In a first embodiment of the invention there is provided a computer implemented method for determining a time delay for time delay compensation of a microphone signal from a microphone array in a beamformer arrangement. For a given time, an instantaneous estimate of a position of a wanted sound source and/or a direction of arrival of a signal originating from the wanted sound source is determined. The processor determines whether the instantaneous estimate deviates from a preset estimate of a position of the wanted sound source and/or a direction of arrival of a signal originating from the wanted sound source according to a predetermined criterion. The predetermined criterion comprises a check whether the instantaneous estimate deviates from the preset estimate by at least a predetermined deviation threshold. If the predetermined criterion is fulfilled, the processor sets the instantaneous estimate for the given time as the preset estimate and determines the time delay for time delay compensation of the microphone signal based on the instantaneous estimate. In certain embodiments, the predetermined deviation threshold corresponds to a minimum distance and/or a minimum angular distance between the instantaneous estimate and the preset estimate.

In other embodiments, the processor determines a confidence measure. In this embodiment, the predetermined criterion further comprises a check whether the confidence measure exceeds a predetermined threshold value. In yet another embodiment, the confidence measure is determined based on a signal-to-noise ratio of at least one microphone signal of the microphone array and/or a deviation between the instantaneous estimate for the given time and an instantaneous estimate for a previous time and/or a sum of deviations between instantaneous estimates of subsequent times.

In yet another embodiment, the predetermined criterion is determined by the processor to be fulfilled, if a plurality or only if all checks of the predetermined criterion yield a positive answer or result.

In embodiments of the invention, the beamformer is an adaptive beamformer and/or operates in conjunction with an adaptive filter. In such an embodiment, if the predetermined criterion is fulfilled, the signal processing system initializes adaptation of the adaptive filter and/or of the adaptive beamformer. In other embodiments, initializing adaptation of the adaptive filter and/or of the adaptive beamformer comprises scaling a preset coefficient and/or a preset parameter of the adaptive filter and/or of the adaptive beamformer by a scaling factor. The processor may store a coefficient and/or a parameter of the adaptive filter and/or of the adaptive beamformer and the corresponding estimate for the position of the wanted sound source and/or the direction of arrival of a signal originating from the wanted sound source in a memory. After setting the instantaneous estimate for the given time as the preset estimate, the processor initializes the adaptation of one or more filters. The processor determines whether the preset estimate for the given time deviates from a stored estimate of the position of the wanted sound source and/or the direction of arrival of a signal originating from the wanted sound source in a memory less than a predetermined value. If the preset estimate for the given time deviates from the stored estimate less than the predetermined value, the processor sets a coefficient and/or parameter of the adaptive filter and/or of the adaptive beamformer to the value of a stored coefficient and/or parameter in the memory corresponding to the stored estimate.

In certain embodiments, the beamformer arrangement may include internally or externally residual echo cancellation logic. If the predetermined criterion is fulfilled, the residual echo cancellation logic becomes active. In certain embodiment the microphone signal may be stored in memory and buffered for processing. Time delay compensation can be readily performed on the buffered microphone signal.

The predetermined criterion can comprise a check whether the instantaneous estimate lies within a predetermined region or within a predetermined sector or solid angle with respect to the microphone array. Additionally, the time delay of the time delay compensation can be set to a preset value after a predetermined time.

In other embodiments, the disclosed methodology can be embodied on a computer readable storage medium as computer code (i.e. a computer program product) for use with a computer or processor for performing the disclosed method steps or may be part of a processing system, such as a speech processing system for use within an automobile.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Embodiments of the present invention provide a method and a system for determining computationally more efficient a time delay for time delay compensation of a microphone signal from a microphone array in a beamformer arrangement. The methodology and system may be embodied within a speech processing system having one or more processors for performing the disclosed methodology. Further, the time delay compensation determination may be embodied in hardware logic such as a circuit or an integrated circuit (e.g. an application specific integrated circuit) or in a field programmable gate array (FPGA). The methodology may be embodied as hardware logic or software logic or a combination thereof. In the software embodiments or partial software embodiments, the computer software will be embodied on a tangible computer readable storage medium i.e. a computer program product. The computer program product is operable in conjunction with a processor that executes the computer code thereon. It should be recognized by one of ordinary skill in the art that the methodology and equations provided herein can be readily adapted as a computer program without undue experimentation.

The present invention determines the time delay for time delay compensation of a microphone signal from a microphone array in a beamformer arrangement. For a given time, an instantaneous estimate of the position of a wanted sound source and/or the direction of arrival of a signal originating from the wanted sound source is determined. The system then determines whether the instantaneous estimate deviates from a preset estimate of a position of the wanted sound source and/or a direction of arrival of a signal originating from the wanted sound source according to a predetermined criterion. The predetermined criterion comprises a check whether the instantaneous estimate deviates from the preset estimate by at least a predetermined deviation threshold. The method allows the time delay to be determined less frequently compared to the prior art. In this way, determining the time delay for time delay compensation is computationally less expensive.

If the predetermined criterion is fulfilled, the instantaneous estimate for the given time is set as the preset estimate. The time delay for time delay compensation of the microphone signal is then determined based on the instantaneous estimate.

Beamformer arrangements may comprise a microphone array comprising at least two microphones. In general, a sound signal originating from a sound source will reach each microphone of the microphone array at a different time, depending on the geometry of the microphone array and the position of the sound source and/or the direction of arrival of the signal with respect to the microphone array. This results in relative time delays between the microphone signals from different microphone channels of the microphone array. By compensating for the relative time delay of each microphone signal corresponding to a certain position of a sound source, in particular of a wanted sound source, or direction of arrival of the signal, the beamformer arrangement can be aligned with this position and/or direction of arrival. In other words, the major lobe of the directional characteristic of the beamformer arrangement, in particular of the beamformer itself, can be aligned with the direction of arrival of a signal originating from the wanted sound source.

Additional weighting may be performed, for example, to account for a propagation loss of the acoustic signal. A weighting coefficient can be determined based on the time delay of a microphone signal. As the method according to the present invention allows the processor to determine the time delay less frequently compared to the prior art, in this case, also the weighting coefficient needs to be modified less frequently.

A beamformer arrangement which subsequently only performs time delay compensation, weighting and summing of the acoustic signals of each microphone is typically called a "conventional beamformer" or "Delay-and-Sum-Beamformer". Beamformer arrangements comprising adaptive filter are usually called "adaptive beamformer".

The time delay can be determined based on an estimate of the position of the wanted sound source and/or the direction of arrival of a sound signal originating from the wanted sound source. As the position and/or the direction of arrival can vary with time, e.g. if the wanted sound source moves, the time delay may be a function of time. Time delay compensation which is performed based on a time delay, which is determined from the position and/or the direction of arrival and is therefore generally time dependent, is usually called "adaptive time delay compensation".

Adaptive time delay compensation may be used in conjunction with a conventional or with an adaptive beamformer.

The time delay may be determined repeatedly. In particular, the time delay may be determined at subsequent times or subsequent points in time. The time interval between two subsequent times or subsequent points in time may be constant, thereby obtaining equidistant time steps.

The microphone array may comprise two or more microphones. Each microphone can output a microphone signal wherein one microphone signal can be delayed with respect to the microphone signal of another microphone due to the given position of the wanted sound source and/or the direction of arrival of the signal originating from the wanted sound source relative to the microphones. Time delay determination for time delay compensation of a microphone signal may be performed for each microphone of the microphone array.

The instantaneous or current estimate may be an estimate of the instantaneous or current position of the wanted sound source and/or of the instantaneous or current direction of arrival of a signal originating from the wanted sound source. The preset estimate may be an estimate of the position of the wanted sound source and/or the direction of arrival of a signal originating from the wanted sound source, for example, for a previous time.

The instantaneous estimate and/or the preset estimate may be specified by one, two or three parameters or coordinates. The one, two or three parameters or coordinates may comprise an angle with respect to a predetermined axis. The predetermined axis can be the direct axis of a linear microphone array, wherein the microphones of the linear microphone array are arranged along the direct axis. The parameters or coordinates may comprise two angles, an angle and a relative distance or two relative distances. The parameters or coordinates may comprise three angles, two angles and a relative distance, one angle and two relative distances or three relative distances. In particular, the position and/or the direction of arrival may be given with respect to the microphone array, for example, with respect to the geometric center or the center of gravity of the positions of the microphones of the microphone array. For instance, the relative distances may be determined with respect to the geometric center or the center of gravity of the microphone positions.

The position and/or the direction of arrival may be identified with the position and/or the direction of arrival with the highest sound energy.

Determining an instantaneous estimate may be performed using the microphone array. In particular, determining an instantaneous estimate may be performed using only the microphone array without additional information. Determining an instantaneous estimate may comprise detecting sound signals by the microphone array output by a loudspeaker and at least partly reflected by the wanted sound source.

The wanted sound source may be a speaker, and/or the microphone signal may comprise a speech signal.

The steps of setting the instantaneous estimate as the preset estimate and determining the time delay can be performed in any order. In particular, if the setting step is performed first, determining the time delay may be based on the instantaneous estimate or on the preset estimate.

Setting the instantaneous estimate as the preset estimate and determining the time delay may be performed if and only if the predetermined criterion is fulfilled.

The method may further comprise compensating for the time delay of the microphone signal from the microphone in the microphone array based on the determined time delay. If the predetermined criterion is not fulfilled, time delay compensation of the microphone signal can be performed with a preset time delay.

If the predetermined criterion is not fulfilled, the steps of setting the instantaneous estimate as the preset estimate and determining the time delay may be omitted.

If the predetermined criterion is not fulfilled, the preset estimate for the given time can be set equal to the preset estimate for a previous time. In other words, if the predetermined criterion is not fulfilled, the preset estimate may be maintained unchanged.

The method may further comprise beamforming to obtain a beamformed signal. Beamforming may comprise weighting and/or summing of time delay compensated microphone signals. Beamforming may be performed by an adaptive or a conventional beamformer.

If the predetermined criterion is not fulfilled, but the instantaneous estimate deviates from the preset estimate, the method may further comprise processing the beamformed signal using a blocking matrix. In this way, the signal quality of the beamformed signal can be enhanced. The blocking matrix may be an adaptive blocking matrix.

The predetermined deviation threshold may depend on the width or diameter of the major lobe of the microphone array.

Determining whether the instantaneous estimate deviates from the preset estimate may be based on one, two or three parameters or coordinates irrespective of whether the instantaneous estimate and/or the preset estimate are specified by one, two or three parameters or coordinates. In particular, determining whether the instantaneous estimate deviates from the preset estimate may be based on one or two angles.

The predetermined deviation threshold may correspond to a minimum distance and/or a minimum angular distance between the instantaneous estimate and the preset estimate. The deviation between the instantaneous estimate and preset estimate may be the difference between two angles. In particular, the first angle may specify the instantaneous estimate and the second angle may specify the preset estimate.

The method may further comprise determining a confidence measure and the predetermined criterion may further comprise a check whether the confidence measure exceeds a predetermined threshold value. In this way, it can be checked, whether the wanted sound source, for example a speaker, is active. If the sound source is passive and only noise is present, the instantaneous estimate determined for the given time can correspond to the position and/or the direction of arrival of a background noise. A deviation of the preset estimate from the instantaneous estimate can then be due to noise and not due to the movement of the wanted sound source. By the check whether the confidence measure exceeds a predetermined threshold value, an unnecessary determination of the time delay for time delay compensation may be avoided.

Alternatively or additionally, the activity of the wanted sound source may be determined from the status of a push-to-talk key. In particular, if the push-to-talk key is being pressed, the wanted sound source may be assumed to be active.

The confidence measure may be determined based on a signal-to-noise ratio of at least one microphone signal of the microphone array. In particular, the confidence measure can be determined based on an average signal-to-noise ratio of microphone signals from microphones in the microphone array at the given time. In particular, the confidence measure may be increased if the signal-to-noise ratio exceeds a predetermined detection threshold. In this case, the wanted sound source may be assumed to be active.

The predetermined detection threshold may be chosen such that the signal has to lie above the noise level.

The confidence measure may be determined based on a deviation between the instantaneous estimate for the given time and an instantaneous estimate for a previous time. In particular, the determination of the confidence measure can comprise a check whether the instantaneous estimate for the given time and the instantaneous estimate for the previous time deviate from each other by more than a predetermined positional threshold value. If the instantaneous estimate for the given time and the instantaneous estimate for the previous time deviate from each other by more than the predetermined positional threshold value, the confidence measure may be decreased or set to 0.

In this way, abrupt changes of the position and/or the direction of arrival which are likely not due to a movement of the wanted sound source, can be excluded to be taken into account for time delay determination.

The confidence measure may be determined based on a sum of deviations between instantaneous estimates of subsequent times. In this way, a continuing movement of the wanted sound source can be detected. In particular, the determination of the confidence measure may comprise a check whether the sum of deviations between instantaneous estimates of subsequent times exceeds a predetermined movement threshold. If the sum of deviations exceeds the predetermined movement threshold, the confidence measure may be decreased or set to 0. In this way a continuous re-determination of the time delay can be avoided.

The confidence measure may be limited by an upper and/or a lower limit. By a limitation of the confidence measure by an upper limit, a maximum time can be fixed for which the wanted sound source is assumed to be active once the confidence measure starts to continuously decrease. In particular, the confidence measure may lie between an upper and a lower limit.

The confidence measure may be mapped to a binary confidence indicator, in particular, which can take only the values 0 or 1. The confidence indicator may be set to a first value if the confidence measure exceeds a predetermined confidence threshold and to a second value otherwise. The first value may be 1. The second value may be 0. The predetermined criterion may comprise a check whether the confidence indicator is equal to the first or the second value.

The predetermined criterion may comprise a plurality of checks. The predetermined criterion may be fulfilled, if a plurality or only if all checks of the predetermined criterion yield a positive answer or result.

The beamformer arrangement may comprise adaptive filter. In particular, the beamformer may be an adaptive beamformer and/or operate in conjunction with adaptive filter, and if the predetermined criterion is fulfilled, the method may further comprise initializing adaptation of the adaptive filter and/or of the adaptive beamformer. Initializing adaptation may comprise setting the coefficients and/or parameters of the adaptive filter and/or of the adaptive beamformer to predetermined values, for example, to preset initial values.

The coefficients and/or parameters of the adaptive filter and/or of the adaptive beamformer may be adapted such as to converge to an optimal solution. If the predetermined criterion is fulfilled, the time delay for time delay compensation usually changes, and the coefficients and/or parameters may have to be re-adapted to the modified time delay to converge to a new optimal solution. Therefore, until the adaptive filter and/or the adaptive beamformer have re-adapted to the modified time delay, the signal quality will be impaired.

The above described method allows to reduce the frequency of re-adaptation of the adaptive systems, as the time delay may be modified less frequently compared to the prior art. In this way, fluctuations in the signal quality due to re-adaptation of the adaptive systems can be reduced. In particular, re-adaptation to small movements of the wanted sound source, i.e. if the instantaneous estimate deviates from the preset estimate by less than the predetermined deviation threshold, may be avoided.

If the predetermined criterion is fulfilled and the time delay for time delay compensation of the microphone signal is determined, initializing adaptation of the adaptive filter and/or the adaptive beamformer can reduce the time it takes until the adaptive systems have converged to a new optimal solution.

Initializing adaptation of the adaptive filter and/or of the adaptive beamformer may comprise scaling a preset coefficient and/or a preset parameter of the adaptive filter and/or of the adaptive beamformer by a scaling factor. In particular, the scaling factor may take values in a predetermined range, in particular, between 0 and 1. The scaling factor may be 0,5. Scaled coefficients and/or parameters can be better estimates for the new optimal values than preset initial values of the coefficients and/or parameters.

Scaling the preset coefficient and/or the preset parameter may comprise a sound frequency dependent scaling factor. The directional characteristic of the beamformer is generally a function of the sound frequency, the number of microphones, their directional characteristic and the geometry of the microphone array. The directive efficiency may be lower for lower frequencies. Consequently, changes for the adaptive systems due to change of the time delay can be smaller. Hence, a scaling factor dependent on the sound frequency may be used.

The method may further comprise storing a coefficient and/or a parameter of the adaptive filter and/or of the adaptive beamformer and the corresponding estimate for the position of the wanted sound source and/or the direction of arrival of a signal originating from the wanted sound source in a memory.

Initializing adaptation may comprise determining whether the preset estimate for the given time deviates from a stored estimate of the position of the wanted sound source and/or the direction of arrival of a signal originating from the wanted sound source in a memory less than a predetermined value, and if the preset estimate for the given time deviates from the stored estimate less than the predetermined value, setting a coefficient and/or parameter of the adaptive filter and/or of the adaptive beamformer to the value of a stored coefficient and/or parameter in the memory corresponding to the stored estimate.

In this way, if the acoustic boundary conditions did not change significantly, the stored values for the coefficients are close to the optimal values, and therefore adaptation can be accomplished faster. The time corresponding to the stored estimate and the stored coefficient and/or parameter may be stored in the memory as well. Initializing adaptation may further comprise determining whether the given time and the stored time deviate by less than a predetermined time difference. In particular, setting a coefficient and/or parameter of the adaptive filter and/or the adaptive beamformer to the value of the stored coefficient and/or parameter may be performed only if the given time and the stored time deviate by less than the predetermined time difference.

The method may further comprise performing echo cancellation or echo compensation. The echo cancellation or echo compensation may be adaptive.

The method may further comprise performing residual echo cancellation. The beamformer arrangement may comprise and/or operate in conjunction with residual echo cancellation logic and if the predetermined criterion is fulfilled, the method may further comprise enforcing residual echo cancellation. The estimate for a residual echo after echo cancellation may result from a power of a reference signal and a coupling coefficient. By increasing the value of the coupling coefficient, residual echo cancellation may be enforced, thereby reducing residual echo in the output signal of the beamformer arrangement. In particular, the coupling coefficient may be set to its preset initial value.

The method may comprise the step of buffering the microphone signal thereby obtaining a buffered microphone signal. In this way, the microphone signal is available for post processing.

Subsequent to determining the time delay, the method may comprise performing time delay compensation of the buffered microphone signal using the determined time delay. As the determination of the time delay for the microphone signal and/or the re-adaptation of possible adaptive filter may take time, the beginning of an utterance of a wanted sound source can suffer from an impaired signal quality after a change of the position and/or of the direction of arrival. By post processing of the buffered microphone signal with a modified time delay and/or modified adaptive filtering coefficients, this problem can be solved. In other words, time delay determination and time delay compensation may be performed asynchronously. The post processing can be performed in a plurality of cycles, i.e. repeatedly or iteratively. In the first cycle, the time delay may be compensated for, in a second cycle, the re-adapted coefficients of the adaptive systems can be accounted for.

When the movement of the wanted sound source is subject to physical or practical restrictions, it may be possible to put constraints on the position and/or the direction of arrival.

The predetermined criterion may comprise a check whether the instantaneous estimate lies within a predetermined region or within a predetermined sector or solid angle with respect to the microphone array. In this way, allowable movements of the wanted sound source may be restricted and an alignment of the beamformer arrangement with a sound source at a completely different position and/or at a completely different direction of arrival than expected for the wanted sound source can be avoided. This may be useful, for example, for speech recognition purposes.

The above-described methods may further comprise fixing after a predetermined time the time delay for time delay compensation to a preset value. In particular, once the beamformer arrangement has adapted to a specific position and/or a specific direction of arrival, the value of the time delay may be fixed to the value corresponding to the specific position and/or to the specific direction of arrival. In this way, utterances from other sound sources than the wanted sound source can be effectively suppressed, in particular, if the position and/or the direction of arrival are known to be, at least approximately, constant. After an utterance of a wanted sound source has ended, determination and modification of the time delay may be enabled again.

Furthermore, the present invention provides a computer program product, comprising one or more computer-readable media having computer executable instructions for performing the steps of one of the above-described methods when run on a computer.

If the predetermined criterion is fulfilled, the time delay determination logic may determine the time delay based on the instantaneous estimate. If the instantaneous estimate for the given time is set as preset estimate, the time delay determination logic can subsequently determine the time delay based on the preset estimate. If the predetermined criterion is not fulfilled, the time delay determination logic may set a preset time delay as the time delay for time delay compensation.

The time delay determination logic and the post processing logic may be realised as one system or as separate systems, which can be, in particular, connected to each other. Each of the time delay determination logic and the post processing logic or both can be implemented as part of the time delay compensation logic.

The beamformer may be an adaptive beamformer.

The system may further comprise an adaptive filter, in particular an adaptive echo cancellation logic and/or an adaptive noise cancellation logic.

The system may further comprise a loudspeaker. In particular, the beamformer arrangement may comprise or work in conjunction with a loudspeaker. Such a loudspeaker, may, for example output speech signals from a far end and/or music signals.

The system may further comprise a buffer, an adaptive blocking matrix and/or a residual echo cancellation logic.

If the predetermined criterion is not fulfilled, but the instantaneous estimate deviates from the preset estimate, the logic comprising the adaptive blocking matrix may be used to correct an impaired beamformer signal.

The invention further provides a hands-free system comprising a system as described above.

Figure 1:
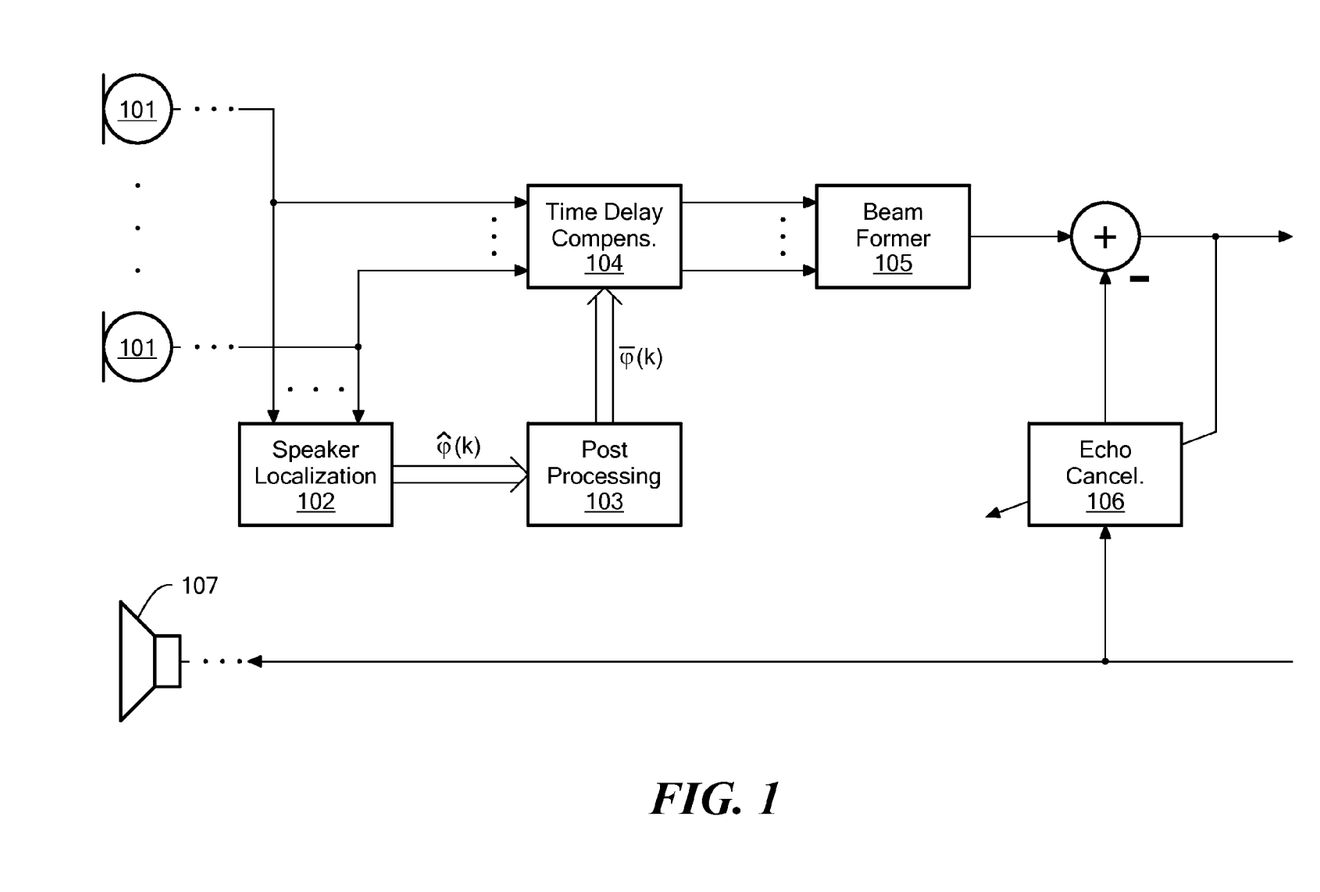
FIG. 1 is shows an example of a beamformer arrangement comprising a beamformer, a speaker localization processor, a s configured to perform time delay compensation and an echo cancellation logic.

In FIG. 1 an example of a beamformer arrangement is shown. The beamformer arrangement comprises microphones 101. The microphones may be arranged as linear microphone array along a direct axis or in another predetermined geometry. The beamformer arrangement further comprises a speaker localization processor 102 for determining an instantaneous estimate based on the microphone signals. Post processing logic 103 determines whether the instantaneous estimate deviates from the preset estimate according to the predetermined criterion and set the preset estimate accordingly. The beamformer arrangement further comprises time delay compensation 104 to determine the time delay for each microphone 101 in the microphone array and to perform time delay compensation for each microphone 101. A beamformer 105 weights and sums the microphone signals thereby aligning the microphone array with the direction of arrival of the signals of the wanted sound source and creating a beamformed signal. The beamformer arrangement further comprises an adaptive echo cancellation logic 106 for echo compensation of the beamformed signal and an additional loudspeaker 107.

In this embodiment, the direction of arrival is specified by a one dimensional angle, $\phi$, which may be measured, for example, with respect to a direct axis of a linear microphone array. The direction of arrival varies as a function of time. In this example, the steps of the method are performed repeatedly with equidistant time steps. The time between two subsequent times may typically lie in the range between 1 ms and 50 ms, in particular it may be chosen to be 5 ms. The number of the time step is denoted by the temporal index k.

A microphone signal is output by each microphone 101 in the microphone array and time delay compensation is performed for each microphone 101 in the microphone array.

A speaker localization processor 102 uses the microphone signals to determine for a given time step or point in time, k, an instantaneous estimate, $\hat{\phi}(k)$, of the direction of arrival of a signal originating from the wanted sound source. In a post processing logic 103, it is determined whether this instantaneous estimate, $\hat{\phi}(k)$, deviates from a preset estimate, $\bar{\phi}(k-1)$, according to the predetermined criterion. If the predetermined criterion is fulfilled, the instantaneous estimate, $\hat{\phi}(k)$, is set as the preset estimate, i.e. $\bar{\phi}(k)=\hat{\phi}(k)$. If the criterion is not fulfilled, the preset estimate for the given time step is set equal to the preset estimate of the previous time step. In other words, the preset estimate, $\bar{\phi}(k-1)$, is maintained, i.e. $\bar{\phi}(k)=\bar{\phi}(k-1)$.

The position and/or the direction of arrival may be determined in various ways (see e.g. "The generalized correlation method for estimation of time delay" by Knapp, C. H. and Carter, G. C., IEEE Transactions on Acoustics, Speech and Signal Processing, vol. 24, no. 4, pp. 320-327, 1976; "Multiple Emitter Location and Signal Parameter Estimation" by Schmidt, R. O., IEEE Transactions on Antennas and Propagation, vol. AP-34, no. 3, 1986; and/or "Adaptive eigenvalue decomposition algorithm for realtime acoustic source localization system" by Huang, Y. et al., Proc. IEEE Int. Conf. Acoustics, Speech and Signal Processing, vol. 2, pp. 937-940, 1998) all of which are incorporated herein by reference in their entirety.

The predetermined criterion comprises a check whether the instantaneous estimate deviates from the preset estimate by at least a predetermined deviation threshold. The predetermined deviation threshold may be chosen such as to yield an increase of the computational efficiency while capturing all significant movements of the wanted sound source. The larger the predetermined threshold is chosen, the more rarely will the predetermined criterion, in general, be fulfilled. Consequently, the time delay can be determined less frequently. On the other side, if the predetermined threshold is chosen too large, significant movements of the wanted sound source might not be captured and the microphone array could consequently be misaligned with the wanted sound source resulting in an impaired signal quality. In particular, the predetermined deviation threshold may take values between 5° and 20°, in particular 10°.

The preset estimate, $\bar{\varphi}(k)$, output by the post processing logic 103 is used by time delay compensation logic 104, which comprises time delay determination logic, to determine the time delay for each microphone 101 in the microphone array. In particular, if the predetermined criterion is not fulfilled, the time delay may be set to a preset time delay for each microphone signal. In other words, the time delay from the previous time step may be maintained if the predetermined criterion is not fulfilled.

In particular, the time delay for each microphone signal may be a relative time delay, in particular relative to a predetermined microphone signal. The predetermined microphone signal may be the signal from a predetermined microphone of the microphone array.

The time delay may be different for each microphone signal.

Time delay compensation logic 104 then performs a time delay compensation for each microphone 101 of the microphone array. The time delay compensated microphone signals are thereafter in a synchronized state. A conventional, i.e. non-adaptive, beamformer 105 may be used to weight and sum the microphone signals. In this way, the microphone array can be aligned with the direction of arrival of the acoustic signal. In other words, the major lobe of the microphone array is then directed at the wanted sound source. Adaptive echo cancellation logic 106 may be used in the beamformer arrangement. The echo cancellation logic can use a reference signal from an additional loudspeaker 107.

The post processing logic may determine whether the instantaneous estimate, $\hat{\varphi}(k)$, deviates from the preset estimate, $\bar{\varphi}(k-1)$, according to the predetermined criterion, wherein the predetermined criterion may comprise a check, whether a predetermined confidence indicator, p(k), equals a first value, for example equal to 1.

In particular, the predetermined criterion may be fulfilled, if a plurality or only if all checks of the predetermined criterion yield a positive answer or result. Hence, the determination of the preset estimate for the given time step, may read:

$$\bar{\varphi}(k) = \begin{cases} \hat{\varphi}(k) & \text{if } |e(k)| > \Theta_e \text{ and } p(k) = 1 \\ \bar{\varphi}(k-1) & \text{else.} \end{cases}$$

Here, e(k) denotes the angular distance between the instantaneous estimate and the preset estimate, i.e. $e(k)=\hat{\varphi}(k)-\bar{\varphi}(k-1)$, and $|e(k)|$ is the absolute value of e(k). The predetermined threshold is denoted by $\Theta_e$, which can take, for example, a value of 10°. The predetermined criterion of this embodiment comprises a check, whether the instantaneous estimate deviates from the preset estimate by at least a predetermined deviation threshold, i.e. whether $|e(k)|>\Theta_e$, and a check whether a predetermined confidence indicator equals a certain value, i.e. whether p(k)=1. The predetermined criterion can be used to assure, that the time delay has to be modified as rarely as possible.

The confidence indicator, p(k), may be determined based on a confidence measure, c(k). The determination of the confidence measure can be based on an average signal-to-noise ratio, $\overline{SNR}$, of the microphones 101 in the microphone array. In particular, c(k) may be modified by $$\tilde{c}'(k) = \begin{cases} c(k-1) + \Delta_R & \text{if } \overline{SNR} > \Theta_{SNR} \\ c(k-1) - \Delta_L & \text{else.} \end{cases}$$

Here, $\Delta_R$ denotes the increment of the confidence measure, which can, for example, be chosen to be $\Delta_R=2$, while $\Delta_L$ denotes the decrement of the confidence measure, which can, for example, be chosen to be $\Delta_L=1$. The predetermined detection threshold, $\Theta_{SNR}$, may lie within a predetermined range, for example between 2 and 20, in particular it may be chosen to be 4.

The confidence measure may be limited by an upper and/or a lower limit, i.e.

$$\tilde{c}(k) = \begin{cases} c_{max} & \text{if } \tilde{c}'(k) > c_{max} \\ c_{min} & \text{if } \tilde{c}'(k) < c_{min} \\ \tilde{c}'(k) & \text{else.} \end{cases}$$

Here $c_{max}$ denotes the upper limit or the confidence measure, which can be chosen, for example, to be $c_{max}=100$, and $c_{min}$ is the lower limit, which may be chosen to be, for example, $c_{min}=0$.

In case of an abrupt change of the position of a wanted sound source and/or of a direction of arrival of a signal originating from the wanted sound source, the confidence measure may be decreased or set to zero. Such an abrupt change can be determined, for example, based on the difference between the instantaneous estimates of two subsequent times, i.e. $d(k)=\hat{\varphi}(k)-\hat{\varphi}(k-1)$. The confidence measure may be decreased or set to zero, if d(k) exceeds a predetermined positional threshold, $\Theta_d$, which can, for example, lie in a range between 2° and 20°, in particular, it may be chosen to be 8°.

Likewise, the confidence measure may be decreased or set to zero, if the wanted sound source is moving constantly, i.e. if the sum over differences between instantaneous estimates of subsequent time steps over a certain time period exceeds a predetermined threshold value for continuous movement, $\Theta_{sum}$, which can, for example, be chosen to be 30°.

Hence, the confidence measure may be modified as follows:

$$c(k) = \begin{cases} 0 & \text{if } |d(k)| > \Theta_d \text{ or } |d_{sum}| > \Theta_{sum} \\ \tilde{c}(k) & \text{else} \end{cases}$$

with $$d_{sum} = \sum_{l=k-k_0}^{k} d(l) = \sum_{l=k-k_0}^{k} \hat{\varphi}(l) - \hat{\varphi}(l-1).$$

Here, $k_0$ denotes the number of time steps, which are being considered for determining whether the wanted sound source is continuously moving, which can be chosen, for example, to be $k_0=20$.

The confidence measure may be mapped to a binary confidence indicator. The confidence indicator may be set to a first value if the confidence measure exceeds a predetermined confidence threshold and to a second value otherwise. In particular, from the confidence measure, a binary confidence indicator, p(k), may be estimated as follows:

$$p(k) = \begin{cases} 1 & \text{if } c(k) > \Theta_p \\ 0 & \text{else} \end{cases}$$

Here, $\Theta_p$ denotes a predetermined confidence threshold, which can be chosen, for example, to be $\Theta_p=6$, if $\Delta_R=2$, $\Delta_L=1$, $c_{max}=100$ and $c_{min}=0$.

The exemplary embodiment shown in FIG. 1 further comprises an adaptive echo cancellation logic 106.

A beamformer arrangement with a plurality of beamformer and echo cancellation logic is known, for example, from "An efficient combination of Multi-Channel Acoustic Echo Cancellation with a Beamforming Microphone Array" by Buchner, H. et al., Proc. Int. Workshop on Hands-Free Speech Communication (HSC), 2001, pp. 55-58, or from "Acoustic Echo Cancellation for Dynamically Steered Microphone Array Systems" by Hämäläinen, M. and Myllylä, V., 2007 IEEE Workshop on Applications of Signal Processing to Audio and Acoustics, 2007, pp. 58-61, all of which are incorporated herein by reference in their entirety.

The coefficients and parameters of the adaptive echo cancellation logic 106 may be adapted such as to yield an optimal echo cancellation for given time delays of the microphones 101 in the microphone array. If the predetermined criterion is fulfilled, the preset estimate and consequently the time delays for the microphones 101 may change. As a consequence, the echo cancellation logic 106 may need to be re-adapted. The adaptive echo cancellation logic 106 can detect that re-adaptation is necessary. This may, however, take a significant amount of time, i.e., for example, longer than the time between two subsequent time steps, in particular, if the change in the time delay was small. Alternatively, if the predetermined criterion is fulfilled, re-adaptation may be directly initialized. In this way, the process of re-adaptation can be accelerated and the time period, in which the signal quality is impaired, will be shortened.

Initializing re-adaptation may comprise resetting the echo cancellation logic 106. In this way, adaptation of the echo cancellation is enforced immediately. This can be achieved by resetting the parameters and/or coefficients of the echo cancellation logic to their initial values.

Alternatively, re-adaptation may comprise scaling the parameters and/or coefficients of the echo cancellation logic with a scaling factor, $\gamma$. Different scaling factors, $\gamma_i$, may be used for different parameters and/or coefficients. The one or more scaling factors may take values in a specified range, in particular between 0 and 1. In one example, $\gamma$ may be chosen to be equal to 0.5. Scaling can be useful, for example, if the difference between the preset estimate for the given time and the preset estimate for the previous time is small, e.g. if $\bar{\phi}(k)-\bar{\phi}(k-1)<\Theta_e$, where $\Theta_e$ is the predetermined deviation threshold. The scaled coefficients and/or parameters may be better estimates for the new optimal values than the initial values of the coefficients and/or parameters.

The directional characteristic of the beamformer is generally a function of the sound frequency, the number of microphones, their directional characteristic and the geometry of the microphone array. Therefore, the one or more scaling factors may be a function of the sound frequency, $\Omega_\mu$, i.e. $\gamma=\gamma(\Omega_\mu)$.

The beamformer arrangement may comprise a memory. A coefficient and/or parameter of the adaptive echo cancellation logic 106 can be stored repeatedly at equidistant time steps, or at a plurality of predetermined times, together with the according preset estimate. The according time may be stored as well. If the predetermined criterion is fulfilled, initializing adaptation may comprise comparing the instantaneous estimate or, subsequent to setting the instantaneous estimate as preset estimate, the preset estimate for the given time with the stored estimates. If the deviation between a stored estimate, e.g. $\bar{\phi}_{stored}$, and the preset estimate for the given time is small, for example, $\bar{\phi}(k)-\bar{\phi}_{stored}<\Theta_e$, where $\Theta_e$ is again the predetermined deviation threshold, one or more coefficients and/or parameters of the echo cancellation logic may be set to the one or more values of the stored coefficients and/or parameters corresponding to the stored estimate $\bar{\phi}_{stored}$.

If additionally the time was stored, the step of setting the coefficients and/or parameters of the echo cancellation logic to the stored values may be, for example, performed if and only if additionally the difference between the given time and the stored time, corresponding to the stored estimate, is smaller than a predetermined value, $k_{diff}$, i.e. $(k-k_{stored})<k_{diff}$, where $k_{diff}$ may be chosen in the case of discrete time steps, for example, to a value of $k_0$, that corresponds to a time period of 2 minutes. If the difference between the given time and the stored time, corresponding to the stored estimate, is smaller than the predetermined value it can be assumed that the acoustic conditions did not change significantly in the given time period and that hence the stored coefficients and/or parameters may be good estimates for the new optimal values for the coefficients and/or parameters of the echo cancellation logic.

Residual echo cancellation may include determining an attenuation value from the signal power and from an estimate for the residual echo after echo cancellation, and applying this attenuation value to the echo compensated signal (see e.g. "Acoustic Echo and Noise Control—A Practical Approach" by Hansler, E. and Schmidt, G., John Wiley & Sons, New York, 2004), which is incorporated herein by reference in its entirety.

Figure 2:
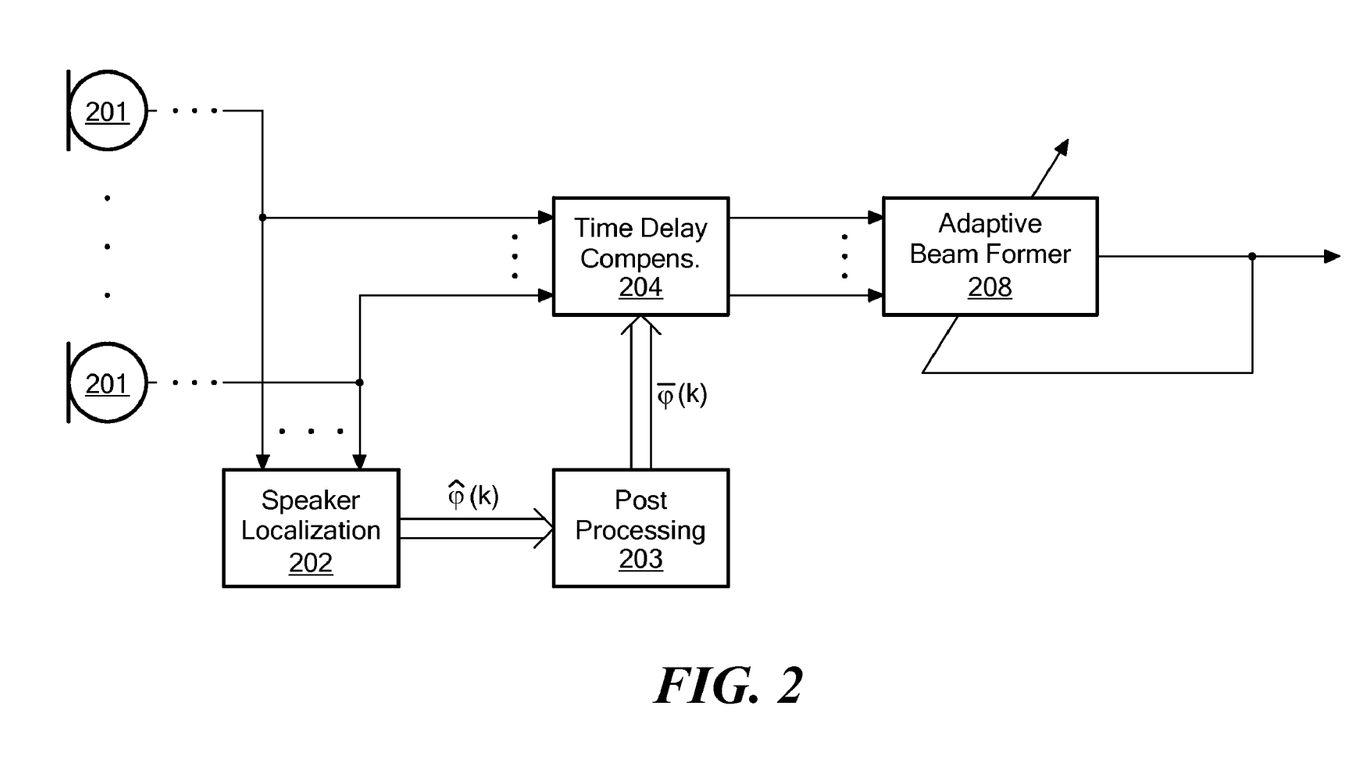
FIG. 2 shows another embodiment of a beamformer arrangement comprising an adaptive beamformer.

In FIG. 2, a beamformer arrangement is shown, which comprises a microphone array comprising microphones 201, speaker localization processor 202, post processing logic 203, time delay compensation logic 204 and an adaptive beamformer 208. The system is, in principle, similar to the embodiment shown in FIG. 1, but without echo cancellation logic 106 and, instead of a conventional beamformer 105, with an adaptive beamformer 208 (see e.g., "Self-calibrating microphone arrays for speech signal acquisition: A systematic approach", by Buck, M. et al., Signal Processing, vol. 86, pp. 1230-1238, 2006; or "A robust adaptive beamformer for microphone arrays with a blocking matrix using constrained adaptive filters", by Hoshuyama, O. et al., IEEE Transactions on Signal Processing, vol 47, no. 10, pp. 2677-2684, October 1999). Another example of an adaptive beamformer is a Generalized-Sidelobe-Canceller (see e.g., "An alternative approach to linearly constrained adaptive beamforming", by Griffiths, L. J. and Jim, C. W., IEEE Transactions on Antennas and Propagation, vol. 30., p. 27, 1982), all of which are incorporated herein by reference in their entirety.

If the predetermined criterion is fulfilled, adaptation of the parameters and/or coefficients of the adaptive beamformer may be initialized. This can be performed in an analogous way as discussed in the context of the adaptive echo cancellation logic 106 shown in FIG. 1.

Figure 3:
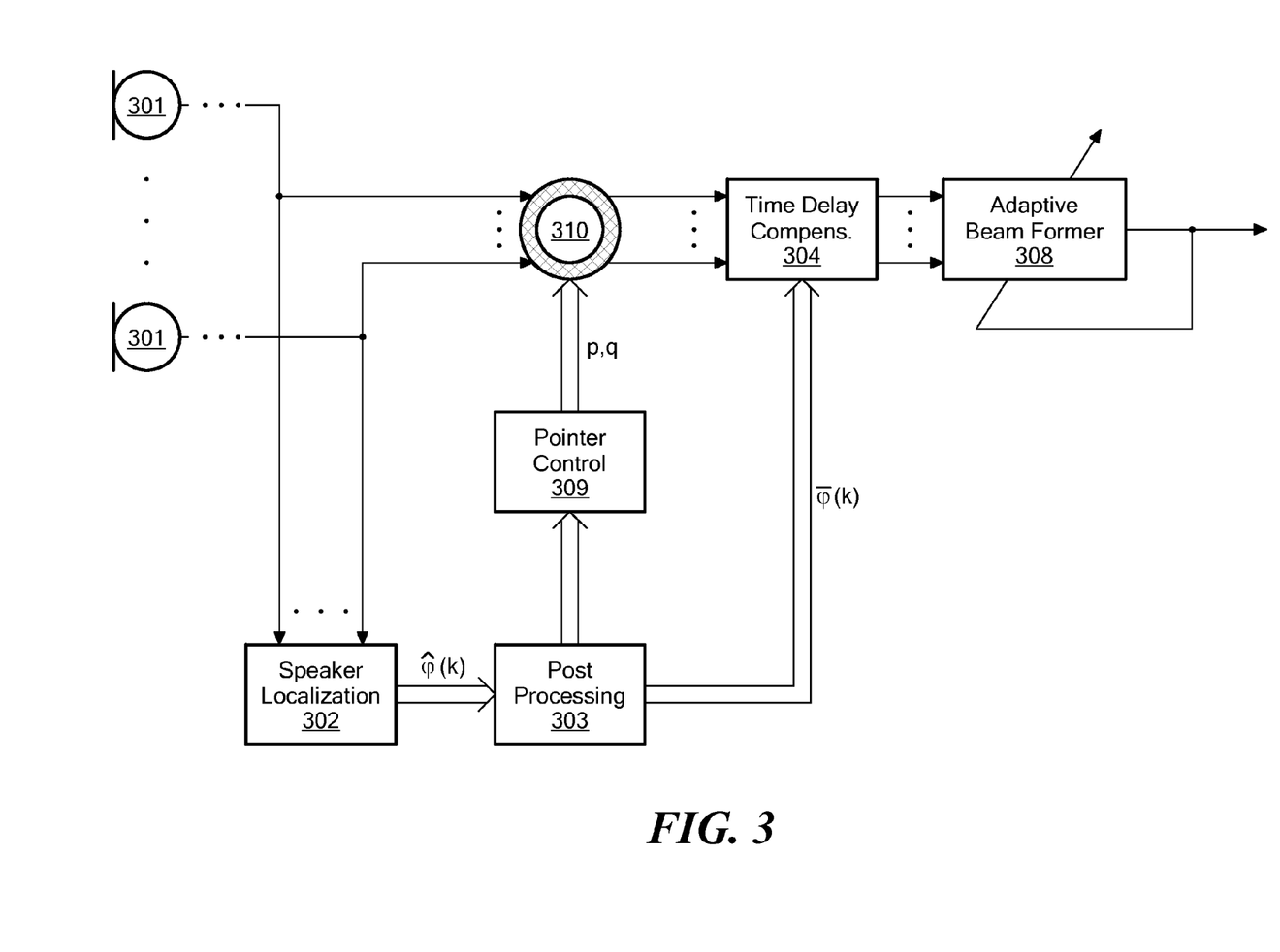
FIG. 3 shows an embodiment of a beamformer arrangement comprising a circular buffer.

In FIG. 3, microphone signals from microphones 301 of a microphone array are stored in a circular buffer 310. Speaker localization processor 302 yields an instantaneous estimate of the position of a speaker and/or the direction of arrival of a signal originating from the speaker. In the post processing logic 303, it is determined whether the instantaneous estimate deviates from a preset estimate according to a predetermined criterion and time delay determination and compensation is performed by time delay compensation logic 304 based on the preset estimate. Pointer control logic 309 control a read pointer, q, and a write pointer, p, of the circular buffer 310. An adaptive beamformer 308 processes the time compensated signals.

The modification of the time delay for a microphone signal due to a new direction of arrival of signals originating from the wanted sound source and/or a new position of the wanted sound source can happen with some delay as, for example, the determination whether the instantaneous estimate deviates from the preset estimate according to a predetermined deviation criterion occupies computation time. It may also take time until the confidence exceeds the threshold $\Theta_p$. Therefore, acoustic signals which are received during the time period between a movement of the wanted sound source and the availability of the time delay based on the new position and/or direction of arrival, may have an impaired signal quality as time delay compensation is performed using a preset time delay. By using a buffer, acoustic signals may be temporarily stored and post processed. Time delay compensation of a microphone signal may be, for example, performed a second time, once the modified time delay has been determined.

For this purpose, an embodiment as shown in FIG. 3 may be used. Before time delay compensation by time delay compensation logic 304, acoustic signals from the microphones 301 are being buffered in a circular buffer 310. Speaker localization by the speaker localization processor 302 and post processing by the post processing logic 303 can happen in real-time, i.e. each signal frame corresponds to a time step, k. Writing the signals to the buffer 310 can happen synchronously at a position indicated by a write pointer, p. Signal processing after the ring buffer (e.g. time delay compensation and/or beamforming) can happen asynchronously. If the predetermined criterion is fulfilled and a time delay based on a preset estimate, $\bar{\phi}(k)$, as described above, is determined, signals with N cycles delay, i.e. signals which were buffered up to N cycles earlier, are being retrieved and time delay compensated for a second time. In a ring buffer, for example, the read pointer of the buffer can be rewound by N cycles. The value of N may depend on the number of time steps required to determine the time delay based on the instantaneous estimate.

Both, the synchronous and the asynchronous signal processing, may take less time than the time represented by a signal frame. Hence, the asynchronous processing steps can make up for lost time ("lost" due to rewinding by N cycles) and then run without time lag until the predetermined criterion is fulfilled again.

The synchronous and the asynchronous signal processing may be performed in two separate processes.

Figures 4, 5:
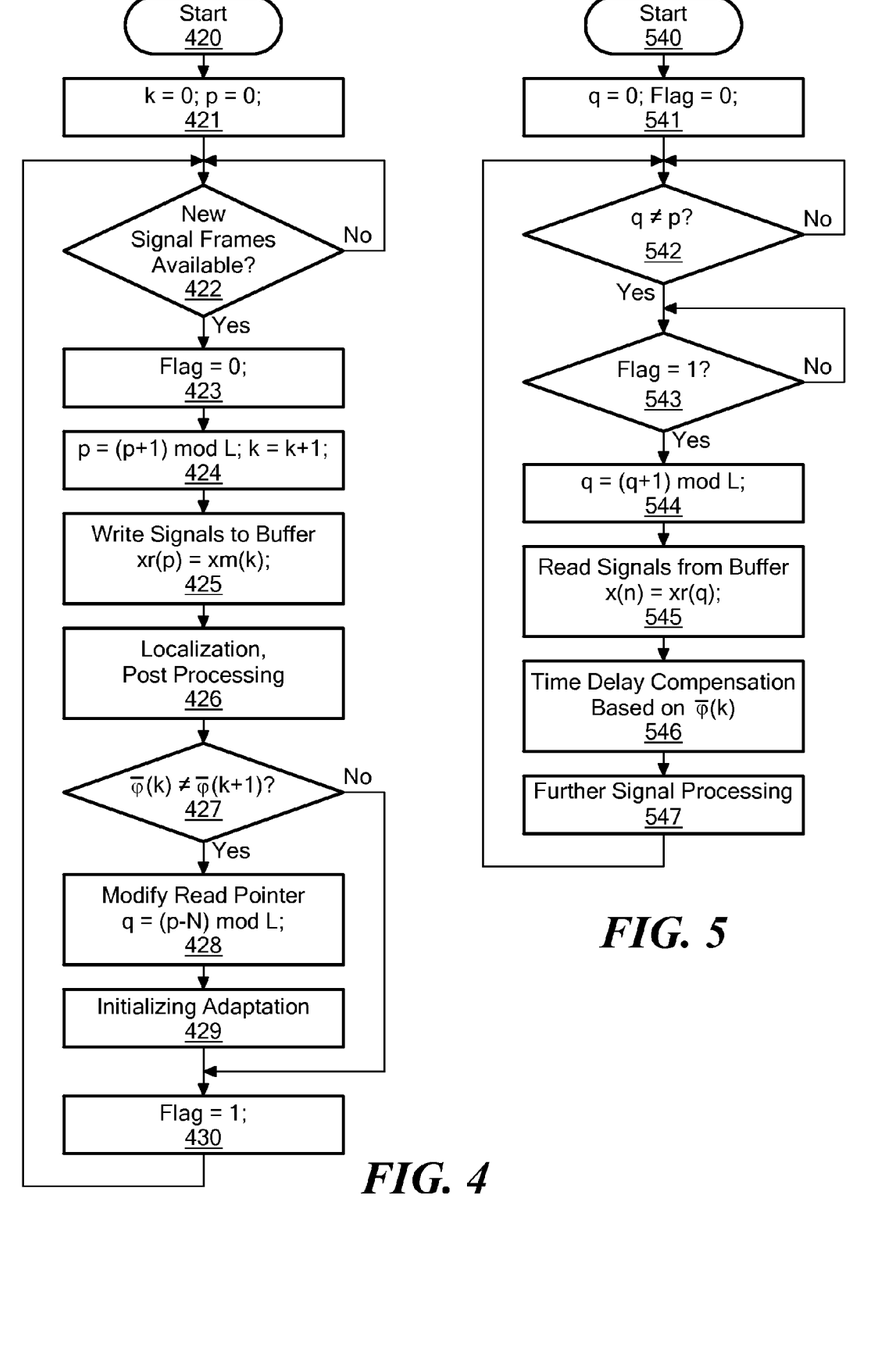
FIG. 4 shows selected steps of a method for time delay determination including buffering of the microphone signals.
FIG. 5 shows selected steps of a method for asynchronously compensating for the time delay of buffered signals.

FIG. 4 shows selected steps of the synchronous process, i.e. the signal processing before time delay compensation. A flag parameter controls the asynchronous process, i.e. the time delay compensation and adaptive beamforming, selected steps of which are shown in FIG. 5.

As long as the synchronous process is waiting for input data, the asynchronous process may be run several times. The length of the circular buffer is denoted by L. The write and read pointer of the buffer are denoted by p and q, respectively. The synchronous process shown in FIG. 4 runs in real-time using a temporal index k, while the asynchronous process shown in FIG. 5 uses a temporal index n.

In FIG. 4 at step 422 it is checked whether new signal frames are available. If so, the write pointer p and the time step k are updated in step 424 (mod denotes the modulo operation) and the signals are written to the buffer in step 425.

In step 426 it is determined whether the instantaneous estimate deviates from the preset estimate according to the predetermined criterion and a preset estimate is output. In step 427 it is checked whether the preset estimate for the given time step deviates from the preset estimate for the previous time step. If so, the read pointer q is modified in step 428 and adaptation of adaptive logic in the beamformer arrangement is initialized in step 429. The flag parameter is set to the value 1 at the end of a synchronous process cycle in step 430.

In FIG. 5 selected steps of the asynchronous process are shown. At step 542 it is checked, whether the read pointer, q, differs from the write pointer, p. If so, it is checked at step 543 whether the flag parameter has the value 1 and if the flag parameter equals one, the read pointer is modified at step 544 and the signals are read from the buffer in step 545. Time delay compensation of the signal is performed in step 546 using a time delay based on the preset estimate, $\bar{\phi}(k)$. Further signal processing, for example beamforming and/or echo cancellation, is performed in step 547.

The embodiments described in context of the FIGS. 3, 4 and 5 are, in particular, useful for speech recognition purposes, as an interim signal delay is tolerable for such applications.

An initial signal delay can be regained by the asynchronous process until the end of an utterance. In this way, the user will not experience any delay. A speech recognition logic only uses the correctly time delay compensated signal.

Time delay compensation of a buffered microphone signal may be performed repeatedly. The control of the read pointer may be modified such that specific steps of the processes shown in FIGS. 4 and/or 5 can be performed several times. A first pass, for example, may be used for speaker localization and correction of the time delay compensation as described above. A second pass may be used to re-adapt adaptive filter, while in a third pass an output signal is produced using the correct time delay and the correspondingly adapted filter coefficients.

Although the previously discussed embodiments of the present invention have been described separately, it is to be understood that some or all of the above described features can also be combined in different ways. The discussed embodiments are not intended as limitations but serve as examples illustrating features and advantages of the invention. The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A computer-implemented method for determining a time delay for time delay compensation of a microphone signal from a microphone array in a beamformer arrangement, comprising:
   determining in a processor, for a given time, an instantaneous estimate of a position of at least one of a wanted sound source and a direction of arrival of a signal originating from the wanted sound source;
   determining in the processor whether the instantaneous estimate deviates from a preset estimate of at least one of a position of the wanted sound source and a direction of arrival of a signal originating from the wanted sound source according to a predetermined criterion, wherein the predetermined criterion comprises a check whether the instantaneous estimate deviates from the preset estimate by at least a predetermined deviation threshold;
   if the predetermined criterion is fulfilled, setting the instantaneous estimate for the given time as the preset estimate in a memory location for the preset estimate; and
   determining in the processor the time delay for time delay compensation of the microphone signal based on the instantaneous estimate.

2. The computer-implemented method according to claim 1, wherein the predetermined deviation threshold corresponds to at least one of a minimum distance and a minimum angular distance between the instantaneous estimate and the preset estimate.

3. The computer-implemented method according to claim 1, wherein the method further comprises:
   determining a confidence measure and wherein the predetermined criterion further comprises a check whether the confidence measure exceeds a predetermined threshold value.

4. The computer-implemented method according to claim 3, wherein the confidence measure is determined based on at least one of:
   a signal-to-noise ratio of at least one microphone signal of the microphone array,
   a deviation between the instantaneous estimate for the given time and an instantaneous estimate for a previous time, and
   a sum of deviations between instantaneous estimates of subsequent times.

5. The computer-implemented method according to claim 1, wherein the predetermined criterion is fulfilled, if at least one of the checks of the predetermined criterion yields a positive result.

6. The computer-implemented method according to claim 1, wherein the beamformer arrangement operates in conjunction with an adaptive filter, and
   if the predetermined criterion is fulfilled, initializing adaptation of the adaptive filter.

7. The computer-implemented method according to claim 6, wherein initializing adaptation of the adaptive filter comprises applying a scaling factor to a preset parameter of the adaptive filter.

8. The computer-implemented method according to claim 6, further comprising:
   storing in a memory a parameter of the adaptive filter; and
   storing in the memory at least one of the corresponding estimate for the position of the wanted sound source and the direction of arrival of a signal originating from the wanted sound source.

9. The computer-implemented method according to claim 6, wherein after setting the instantaneous estimate for the given time as the preset estimate, the method further comprising:
   resetting the parameters of the adaptive filter to a plurality of stored initialized values in the memory if, for the given time, the preset estimate deviates by a predetermined value from a stored estimate of at least one of the position of the wanted sound source and the direction of arrival of a signal originating from the wanted sound source.

10. The computer-implemented method according to claim 1, wherein the beamformer arrangement operates in conjunction with residual echo cancellation logic if the predetermined criterion is fulfilled.

11. The computer-implemented method according to claim 1 further comprising: buffering the microphone signal, thereby obtaining a buffered microphone signal.

12. The computer-implemented method according to claim 11, wherein subsequent to determining the time delay, the method comprises performing time delay compensation of the buffered microphone signal using the determined time delay.

13. The computer-implemented method according to claim 1, wherein the predetermined criterion comprises a check whether the instantaneous estimate lies within at least one of a predetermined region, a predetermined sector, and a solid angle with respect to the microphone array.

14. The computer-implemented method according to claim 1 further comprising:
fixing after a predetermined time the time delay for time delay compensation to a preset value.

15. A computer program product comprising a non-transitory computer readable storage medium having computer code thereon for determining a time delay for time delay compensation of a microphone signal from a microphone array in a beamformer arrangement, the computer code comprising:
computer code for determining, for a given time, an instantaneous estimate of at least one of a position of a wanted sound source, and a direction of arrival of a signal originating from the wanted sound source;
computer code for determining whether the instantaneous estimate deviates from a preset estimate of at least one of a position of the wanted sound source, and a direction of arrival of a signal originating from the wanted sound source according to a predetermined criterion, wherein the predetermined criterion comprises a check whether the instantaneous estimate deviates from the preset estimate by at least a predetermined deviation threshold;
computer code for setting the instantaneous estimate for the given time as the preset estimate if the predetermined criterion is fulfilled; and
computer code for determining the time delay for time delay compensation of the microphone signal based on the instantaneous estimate.

16. The computer program product according to claim 15, wherein the predetermined deviation threshold corresponds to at least one of:
a minimum distance, and
a minimum angular distance between the instantaneous estimate and the preset estimate.

17. The computer program product according to claim 15, wherein the computer code further comprises:
computer code for determining a confidence measure; and
computer code for determining whether the confidence measure exceeds a predetermined threshold value.

18. The computer program product according to claim 17, wherein the confidence measure is determined based on at least one of:
a signal-to-noise ratio of at least one microphone signal of the microphone array,
a deviation between the instantaneous estimate for the given time and an instantaneous estimate for a previous time, and
a sum of deviations between instantaneous estimates of subsequent times.

19. The computer program product according to claim 15, wherein the predetermined criterion is fulfilled if at least one of the checks of the predetermined criterion yields a positive result.

20. The computer program product according to claim 15, wherein the beamformer operates in conjunction with an adaptive filter if the predetermined criterion is fulfilled.

21. The computer program product according to claim 20, wherein the computer code for initializing adaptation of the adaptive filter comprises computer code for applying a scaling factor to a preset parameter of the adaptive filter.

22. The computer program product according to claim 20, further comprising:
computer code for storing in a memory a parameter of the adaptive filter; and
computer code for storing in the memory the corresponding estimate for at least one of the position of the wanted sound source and the direction of arrival of a signal originating from the wanted sound source.

23. The computer program product according to claim 20, wherein after setting the instantaneous estimate for the given time as the preset estimate, the computer program product further comprising:
computer code for resetting the parameters of the adaptive filter to a plurality of stored initialized values in the memory if, for the given time, the preset estimate deviates by a predetermined value from a stored estimate of at least one of the position of the wanted sound source and the direction of arrival of a signal originating from the wanted sound source.

24. The computer program product according to claim 15, wherein the predetermined criterion comprises a check whether the instantaneous estimate lies within at least one of a predetermined region, a predetermined sector, and a solid angle with respect to the microphone array.

25. The computer program product according to claim 15, further comprising:
computer code for fixing after a predetermined time the time delay for time delay compensation to a preset value.

26. A system for determining a time delay for time delay compensation of a microphone signal from a microphone array in a beamformer arrangement, comprising:
a processor for determining, for a given time, an instantaneous estimate of at least one of a position of a wanted sound source and a direction of arrival of a signal originating from the wanted sound source; and
a logic circuitry determining whether the instantaneous estimate deviates from a preset estimate of at least one of a position of the wanted sound source and a direction of arrival of the signal originating from the wanted sound source according to a predetermined criterion, wherein the predetermined criterion comprises a check whether the instantaneous estimate deviates from the preset estimate by at least a predetermined deviation threshold;
the logic circuitry setting the instantaneous estimate for the given time as the preset estimate in a memory location for the preset estimate if the predetermined criterion is fulfilled;
the logic circuitry determining the time delay for time delay compensation of the microphone signal based on the instantaneous estimate.

27. The system according to claim 26, wherein the predetermined deviation threshold corresponds to at least one of a minimum distance and a minimum angular distance between the instantaneous estimate and the preset estimate.

28. The system according to claim 26, wherein the processor determines a confidence measure based on at least one of:
a signal-to-noise ratio of at least one microphone signal of the microphone array,
a deviation between the instantaneous estimate for the given time and an instantaneous estimate for a previous time, and
a sum of deviations between instantaneous estimates of subsequent times.

29. The system according to claim 28, wherein the logic circuitry determines whether the confidence measure exceeds a predetermined threshold value.

30. The system according to claim 26, wherein the predetermined criterion is fulfilled, if at least one of the checks of the predetermined criterion yields a positive result.

31. The system according to claim 26, wherein the microphone array operates in conjunction with an adaptive filter if the predetermined criterion is fulfilled.

32. The system according to claim 31, wherein the logic circuitry initializes the adaptive filter by applying a scaling factor to a preset parameter of the adaptive filter.

33. The system according to claim 31, wherein the logic circuitry stores in a memory at least one of:
the parameters of the adaptive filter,
an estimate for the position of the wanted sound source, and
the direction of arrival of a signal originating from the wanted sound source.

34. The system according to claim 33, wherein after setting the instantaneous estimate for the given time as the preset estimate, the logic circuitry resets the parameters of the adaptive filter to a plurality of stored initialized values in the memory if, for the given time, the preset estimate deviates by a predetermined value from at least one of:
the stored estimate of the position of the wanted sound source, and
the stored direction of arrival of a signal originating from the wanted sound source.

35. The system according to claim 26, wherein the beamformer arrangement operates in conjunction with a residual echo cancellation logic if the predetermined criterion is fulfilled.

36. The system according to claim 26, wherein the logic circuitry buffers the microphone signal to the beamformer arrangement.

37. The system according to claim 36, wherein the logic circuitry performs time delay compensation to the microphone signal going to the beamformer arrangement using the determined time delay.

38. The system according to claim 26, wherein the logic circuitry predetermines if the criterion is fulfilled by checking whether the instantaneous estimate lies within at least one of a predetermined region, a predetermined sector, and a solid angle with respect to the microphone array.

39. The system according to claim 26, wherein the logic circuitry resets the time delay compensation to a preset value after a predetermined time.

* * * * *